United States Patent Office 3,160,570
Patented Dec. 8, 1964

3,160,570
METHOD FOR PRODUCING 6-DEMETHYL-
CHLORTETRACYCLINE
Eugene L. Dulaney, Metuchen, and David Hendlin,
Springfield, N.J., assignors to Merck & Co., Inc., Rahway, N.J., a corporation of New Jersey
No Drawing. Filed Dec. 20, 1961, Ser. No. 160,919
4 Claims. (Cl. 195—80)

This invention relates to the preparation of tetracycline compounds. More particularly, it is concerned with the preparation of 6-demethyltetracyclines.

It has been found that 6-demethyltetracyclines are valuable antibiotics which are characterized by being more stable under acidic and alkaline conditions than the corresponding tetracyclines such as chlortetracycline, oxytetracycline and tetracycline. In addition, these demethylated compounds have been found to have biological activities similar to the tetracyclines.

It is an object of the present invention to provide new methods for the production of 6-demethyltetracyclines. A further object is to provide new methionine dependent strains of tetracycline-producing microorganisms. Other objects will be apparent from the detailed description of this invention hereinafter provided.

In accordance with the present invention, it is found that demethylated tetracyclines are produced by growing methionine dependent strains of tetracycline-producing microorganisms or strains having biochemical lesions anywhere along the route to methionine in suitable mediums. Thus, 6-demethylchlortetracycline can be produced by growing a strain of a chlortetracycline-producing microorganism having biochemical lesions in its sulfur metabolism in suitable mediums. For example, methionine-dependent strains of chlortetracycline-producing microorganisms can be grown in aqueous mediums containing assimilable sources of carbon and nitrogen and concentrations of methionine optimal for the production of maximum yields of 6-demethyltetracycline. Specifically, 6-demethylchlortetracycline is produced by growing suitable strains of S. viridifaciens in a medium in which cottonseed endosperm flour is used as the complex source of nitrogen, carbon, energy and minor growth factors in the nutrient medium. The use of cottonseed endosperm flour is especially valuable in this invention since this material contains only a limited amount of methionine. It is often desirable to supplement the culture medium with additional nutrients. Glucose, sucrose, or starch are suitable materials. However, any complex medium limited in methionine is suitable for the practice of this invention. A chemically defined medium may be employed, also, if all the required nutrients for growth and tetracycline production are present.

Pursuant to one embodiment of the present invention, it is found that when methionine dependent strains of S. viridifaciens are grown in nutrient mediums containing limited amounts of methionine, 6-demethylchlortetracycline is produced. Strains of the microorganism which are suitable for this purpose include the strain of S. viridifaciens identified in the American Type Culture Collection as ATCC–11989 and certain auxotrophs obtained by the mutation of this organism. One such auxotroph, No. 28, is identified in the Culture Collection of Merck & Co., Inc., at Rahway, New Jersey, as MA 1044. This methionine-less auxotroph was obtained by the ultraviolet light treatment of strain ATCC–11989. Another strain, No. 216, similarly obtained is identified as MA 1045 which responds rapidly to methionine and to sodium thiosulfate with longer incubation. The auxotrophs 28 and 216 have been deposited in the culture collection of the Fermentation Section of the Northern Utilization Research Branch, United States Department of Agriculture, at Peoria, Illinois, where they are identified as NRRL 2964 and 2965 respectively.

The requirements of these various dependent strains will vary. Some will respond to a reduced form of sulfur. Others will require some intermediate in methionine synthesis and others will respond only to methionine. Their response to various concentrations of the requirement will also vary. Thus, some of the strains can be grown in medium containing cottonseed endosperm flour and small amounts of methionine and still produce 6-demethylchlortetracycline. Other strains are much more responsive to small amounts of methionine and in the presence of added methionine will no longer produce the desired 6-demethylchlortetracycline. The amount of methionine in the nutrient medium which these methionine-less mutants will tolerate can be readily determined by experimentation in accordance with procedures well known in this art.

The following examples are provided to illustrate methods of carrying out the present invention.

EXAMPLE

*Experimental Methods*

*Preparation of inoculum.*—Spores from agar slant cultures of auxotroph No. 28 were scraped free in sterile 0.85% sodium chloride solution, and an aliquot of the resulting suspension transferred to 50 ml. of the following medium (sterile, in 250 ml. Erlenmeyer flask):

| | |
|---|---:|
| Starch _____g__ | 30 |
| Dextrose _____g__ | 2 |
| $(NH_4)_2SO_4$ _____g__ | 5 |
| $CaCO_3$ _____g__ | 5 |
| NaCl _____g__ | 5 |
| $K_2HPO_4$ _____g__ | 2 |
| $MgSO_4 \cdot 7H_2O$ _____g__ | 1 |
| $FeSO_4 \cdot 7H_2O$ _____mg__ | 10 |
| $ZnSO_4 \cdot 7H_2O$ _____mg__ | 10 |
| L-methionine _____mg__ | 100 |

Dist. $H_2O$ to 1000 ml.
Autoclave 15 minutes, 15 p.s.i.

After 48 hours' incubation at 28° C. on rotary shaker, the growth was harvested by centrifugation under asceptic conditions and washed twice with sterile 0.85% sodium chloride solution. After the second washing, the inoculum was brought to original volume with sterile saline, and 2.5 ml. aliquots were used to inoculate each fermentation flask.

*Fermentation medium.*—The following basal fermentation medium (50 ml. per 250 ml. flask), with appropriate supplements as indicated, was employed in these studies:

| | |
|---|---:|
| Sucrose _____g__ | 30 |
| $(NH_4)_2SO_4$ _____g__ | 4 |
| Cottonseed endosperm flour _____g__ | 6 |
| $CaCO_3$ _____g__ | 8 |
| $ZnSO_4 \cdot 7H_2O$ _____mg__ | 30 |

Dist. $H_2O$ to 1000 ml.
Autoclave 15 minutes, 15 p.s.i.

Supplements to the basal medium were made prior to sterilization.

*Fermentation procedure.*—After inoculation, the fermentation flasks were incubated at 28° C. on rotary shaker, and 1.0 ml. aliquots were aseptically removed daily. Samples were diluted and assayed (cup-plate) for chlortetracycline activity. After incubation the flasks were harvested, adjusted to pH 1–2 with HCl and filtered. The filtrates were then adjusted to pH 7–8 and extracted with n-butanol. After removal of butanol by lyophilization, the residue was redissolved in methanol and examined by paper chromatography.

In one experiment with auxotroph 28, the fermentation medium was supplemented with 25 μg./ml. and with 200 μg./ml. of methionine and the presence of 6-demethylchlortetracycline in the resulting broths was determined by paper chromatography. The results of this experiment are shown in the following table:

| Addition to Fermentation Medium | Chlortetracycline Assay | | Tetracyclines Present | |
|---|---|---|---|---|
| | 24 hr. | 72 hr. | CTC [1] | 6-D [2] |
| None | 15 | 37 | + | + |
| Methionine, 25 μg./ml | 20 | 67 | + | ± |
| Methionine, 200 μg./ml | 25 | 84 | + | ± |

[1] Chlortetracycline.
[2] 6-Demethylchlortetracycline.

Thus, the above experiment shows that 6-demethylchlortetracycline is present in both the unsupplemented broth and the brorth supplemented with 25 μg./ml. of methionine but absent in the broth supplemented at the level of 200 μg. ml.

In another experiment with auxotroph 216, the fermentation medium was supplemented with 50 μg./ml. of methionine and the presence of 6-dimethylchlortetracycline in the resulting broths determined by paper chromatography. The results of this experiment are shown in the following table:

| Addition to Fermentation Medium | Products | | |
|---|---|---|---|
| | Chlortetracycline | 6-Demethylchlortetracycline | Tetracycline |
| None | +++ | +++ | + |
| Methionine, 50 μg./ml | +++ | +++ | − |

Thus, this mutant produces 6-demethylchlortetracycline in both the unsupplemented and supplemented broth, although the broth supplemented with 50 μg./ml. of methionine no longer produced tetracycline.

Various changes and modifications of the invention can be made, and to the extent that such changes incorporate the spirit of this invention, they are intended to be included within the scope of the appended claims.

What is claimed is:

1. The process for producing 6-dimethylchlortetracycline which comprises growing a methionine dependent strain of *Streptomyces viridifaciens* in an aqueous medium containing assimilable sources of carbon and nitrogen, said medium containing concentrations of methionine optimal for the production of maximum yields of 6-demethylchlortetracycline.

2. The process according to claim 1 in which cottonseed endosperm flour is utilized as a source of carbon and energy.

3. The process according to claim 1 wherein the methionine dependent strain is *Streptomyces virdifaciens* NRRL 2964.

4. The process according to claim 1 wherein the methionine dependent strain is *Streptomyces virdifaciens* NRRL 2965.

References Cited in the file of this patent
UNITED STATES PATENTS

| 2,563,793 | Moyer | Aug. 7, 1951 |
| 2,878,289 | McCormick et al. | Mar. 17, 1959 |

UNITED STATES PATENT OFFICE
CERTIFICATE OF CORRECTION

Patent No. 3,160,570            December 8, 1964

Eugene L. Dulaney et al.

It is hereby certified that error appears in the above numbered patent requiring correction and that the said Letters Patent should read as corrected below.

Column 4, lines 10 and 11, for "6-dimethylchlortetracycline" read -- 6-demethylchlortetracycline --; column 4, lines 22 and 25, for "virdifaciens", in italics, each occurence, read -- viridifaciens --, in italics.

Signed and sealed this 27th day of April 1965.

(SEAL)
Attest:

ERNEST W. SWIDER
Attesting Officer

EDWARD J. BRENNER
Commissioner of Patents